US012480128B2

(12) United States Patent
Sczakiel et al.

(10) Patent No.: US 12,480,128 B2
(45) Date of Patent: Nov. 25, 2025

(54) ANTISENSE DRUG AGAINST THE HUMAN INTERCELLULAR ADHESION MOLECULE 1 (ICAM-1)

(71) Applicant: Universität Zu Lübeck, Lübeck (DE)

(72) Inventors: Georg Sczakiel, Groß Grönau (DE); Rosel Kretschmer-Kazemi Far, Lübeck (DE)

(73) Assignee: Universität Zu Lübeck, Lübeck (DE)

( * ) Notice: Subject to any disclaimer, the term of this patent is extended or adjusted under 35 U.S.C. 154(b) by 1122 days.

(21) Appl. No.: 17/425,081

(22) PCT Filed: Dec. 17, 2019

(86) PCT No.: PCT/EP2019/085539
§ 371 (c)(1),
(2) Date: Jul. 22, 2021

(87) PCT Pub. No.: WO2020/151881
PCT Pub. Date: Jul. 30, 2020

(65) Prior Publication Data

US 2022/0106601 A1 Apr. 7, 2022

(30) Foreign Application Priority Data

Jan. 25, 2019 (EP) .................................... 19153666

(51) Int. Cl.
*C12N 15/113* (2010.01)

(52) U.S. Cl.
CPC ...... *C12N 15/1138* (2013.01); *C12N 2310/11* (2013.01); *C12N 2310/315* (2013.01); *C12N 2310/321* (2013.01); *C12N 2310/322* (2013.01); *C12N 2310/341* (2013.01); *C12N 2320/30* (2013.01)

(58) Field of Classification Search
CPC ........... C12N 15/1138; C12N 2310/11; C12N 2310/315; C12N 2310/321; C12N 2310/322; C12N 2310/341; C12N 2320/30
See application file for complete search history.

(56) References Cited

U.S. PATENT DOCUMENTS 11,293,064 B2 * 4/2022 Rigoutsos ............ C12Q 1/6886
2007/0021360 A1 * 1/2007 Nyce ..................... C12N 15/111
514/26

FOREIGN PATENT DOCUMENTS

WO WO 2000/18907 4/2000
WO WO-0018907 A2 * 4/2000 ......... C12N 15/1138
WO WO-2006034348 A2 * 3/2006 ................ A61P 1/16

OTHER PUBLICATIONS

Van de Stolpe, A, and P T van der Saag. "Intercellular adhesion molecule-1." Journal of molecular medicine (Berlin, Germany) vol. 74,1 (1996): 13-33. doi: 10.1007/BF00202069 (Year: 1996).*
Marafini, I., & Monteleone, G. (2018). Inflammatory bowel disease: new therapies from antisense oligonucleotides. Annals of Medicine, 50(5), 361-370. (Year: 2018).*
Huber, L. C., Distler, O., Gay, R. E., & Gay, S. (2006). Antisense strategies in degenerative joint diseases: sense or nonsense ?. Advanced drug delivery reviews, 58(2), 285-299. (Year: 2006).*
Potaczek, D. P., Garn, H., Unger, S. D., & Renz, H. (2016). Antisense molecules: A new class of drugs. Journal of Allergy and Clinical Immunology, 137(5), 1334-1346. (Year: 2016).*
Conrad, C., Gilliet, M. Psoriasis: from Pathogenesis to Targeted Therapies. Clinic Rev Allerg Immunol 54, 102-113 (2018). https://doi.org/10.1007/s12016-018-8668-1 (Year: 2018).*
Translation of WO2000018907A2, obtained from Google Patents on Feb. 7, 2025, https://patents.google.com/patent/WO2000018907A2/en?oq=WO+200018907 (Year: 2000).*
Deleaveyet al, Designing chemically modified oligonucleotides for targeted gene silencing, 2012, Chem. Biol. vol. 19, pp. 937-954.
Khvorovaet al, The chemical evolution of oligonucleotide therapies of clinical utility, 2017, Nature Biotechnol. vol. 35, pp. 238-248.
Nedbal et al, Antisense-mediated inhibition of ICAM-1 expression: a therapeutic strategy against inflammation of . . . , 2002, Antisense Nucl Acid Drug Develop vol. 12, pp. 71-78.
Patzsel et al., A theoretical approach to selec effective antisense oligodeoxyribonucleotides at high statistical probability, 1999, Nucl Acids Res. vol. 27, pp. 4328-4334.
Khorova et al., The chemical evolution of oligonucleotide therapies of clinical utility, 2017, Nature Biotechnol. vol. 35, pp. 238-248.
Nedbal et al., Antisense-mediated inhibition of ICAM-1 expression: a therapeutic strategy against inflammation of . . . , 2002, Antisense Nucl Acid Drig Deliv vol. 12, pp. 71-78.
Patzel et al, A theoretical approach to select effective antisense oligodeoxy-ribonbucleotides at high statistical probability, 1999, Nucl. Acids Res. vol. 27, pp. 4328-4334.

* cited by examiner

*Primary Examiner* — Jennifer Dunston
*Assistant Examiner* — Christina Tran
(74) *Attorney, Agent, or Firm* — HelixIP LLP

(57) ABSTRACT

The present invention relates to a specific antisense oligonucleotide which inhibits the expression of the adhesion molecule ICAM-1 in human cells. The present invention further relates to a vector containing said oligonucleotide and a host cell containing said vector or oligonucleotide and a pharmaceutical composition containing said oligonucleotide as well as uses thereof, in particular in the treatment of an inflammatory disease or condition in humans.

4 Claims, 1 Drawing Sheet

Specification includes a Sequence Listing.

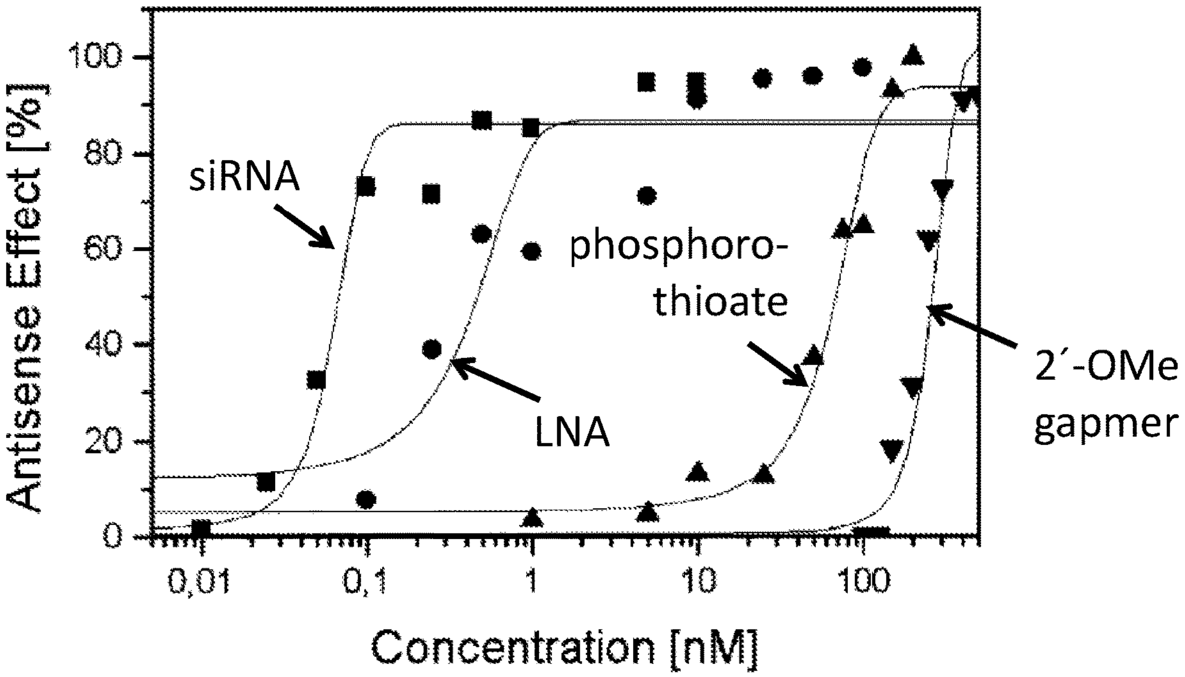
Antisense Effect [%]
100
80
60
40
20
0
0,01
0,1
1
10
100
Concentration [nM]
siRNA
LNA
phosphoro-
thioate
2´-OMe
gapmer

```
                         SEQUENCE LISTING

<160> NUMBER OF SEQ ID NOS: 16

<210> SEQ ID NO 1
<211> LENGTH: 20
<212> TYPE: DNA
<213> ORGANISM: Artificial Sequence
<220> FEATURE:
<223> OTHER INFORMATION: Gapmer oliguncleotide with a central single
      stranded DNA oligonucleotide sequence flanked on both ends by
      single stranded 2'-O-methyl RNA oligonucleotide sequences and
      having phosphorothioate-modified internucleotide phosphates
<220> FEATURE:
<221> NAME/KEY: misc_feature
<222> LOCATION: (1)..(4)
<223> OTHER INFORMATION: 2'-O-methyladenosine, um, 2'-O-methyl-5-
      methylcytidine, 2'-O-methyladenosine
<220> FEATURE:
<221> NAME/KEY: misc_feature
<222> LOCATION: (1)..(20)
<223> OTHER INFORMATION: phosphorothioate-modified internucleotide
      phosphates
<220> FEATURE:
<221> NAME/KEY: misc_feature
<222> LOCATION: (9)..(9)
<223> OTHER INFORMATION: 2'-deoxy-5-methylcytidine
<220> FEATURE:
<221> NAME/KEY: misc_feature
<222> LOCATION: (14)..(15)
<223> OTHER INFORMATION: 2'-deoxy-5-methylcytidine, 2'-deoxy-5-
      methylcytidine
<220> FEATURE:
<221> NAME/KEY: misc_feature
<222> LOCATION: (17)..(20)
<223> OTHER INFORMATION: 2'-O-methyladenosine, gm, um, gm

<400> SEQUENCE: 1

ancagatgcg tggcctannn                                                  20


<210> SEQ ID NO 2
<211> LENGTH: 20
<212> TYPE: DNA
<213> ORGANISM: Artificial Sequence
<220> FEATURE:
<223> OTHER INFORMATION: central oligonucleotide sequence with
      monophosphorothioate internucleotide linkages flanked on both ends
      by locked nucleic acids
<220> FEATURE:
<221> NAME/KEY: misc_feature
<222> LOCATION: (1)..(4)
<223> OTHER INFORMATION: locked nucleic acid modified nucleotides
<220> FEATURE:
<221> NAME/KEY: misc_feature
<222> LOCATION: (4)..(16)
<223> OTHER INFORMATION: phosphorothioate-modified internucleotide
      phosphates between nucleotides 4 to 16
<220> FEATURE:
<221> NAME/KEY: misc_feature
<222> LOCATION: (17)..(20)
<223> OTHER INFORMATION: locked nucleic acid modified nucleotides

<400> SEQUENCE: 2

atcagatgcg tggcctagtg                                                  20


<210> SEQ ID NO 3
<211> LENGTH: 20
<212> TYPE: DNA
```

```
<213> ORGANISM: Artificial Sequence
<220> FEATURE:
<223> OTHER INFORMATION: oligonucleotide with 2'-fluoro-modified riboses
<220> FEATURE:
<221> NAME/KEY: misc_feature
<222> LOCATION: (1)..(20)
<223> OTHER INFORMATION: 2'-fluoro-modified riboses

<400> SEQUENCE: 3

atcagatgcg tggcctagtg                                            20


<210> SEQ ID NO 4
<211> LENGTH: 20
<212> TYPE: DNA
<213> ORGANISM: Artificial Sequence
<220> FEATURE:
<223> OTHER INFORMATION: Gapmer oliguncleotide with a central single
      stranded oligonucleotide sequence flanked on both ends by single
      stranded 2'-fluoro-modified oligonucleotide sequences and having
      phosphorothioate-modified internucleotide phosphates
<220> FEATURE:
<221> NAME/KEY: misc_feature
<222> LOCATION: (1)..(4)
<223> OTHER INFORMATION: 2'-fluoro-modified riboses
<220> FEATURE:
<221> NAME/KEY: misc_feature
<222> LOCATION: (1)..(20)
<223> OTHER INFORMATION: phosphorothioate-modified internucleotide
      phosphates
<220> FEATURE:
<221> NAME/KEY: misc_feature
<222> LOCATION: (17)..(20)
<223> OTHER INFORMATION: 2'-fluoro-modified riboses

<400> SEQUENCE: 4

atcagatgcg tggcctagtg                                            20


<210> SEQ ID NO 5
<211> LENGTH: 20
<212> TYPE: DNA
<213> ORGANISM: Artificial Sequence
<220> FEATURE:
<223> OTHER INFORMATION: oligonucleotide with 2'-O-methyl-modified
      riboses
<220> FEATURE:
<221> NAME/KEY: misc_feature
<222> LOCATION: (1)..(20)
<223> OTHER INFORMATION: 2'-O-methyl-modified riboses

<400> SEQUENCE: 5

atcagatgcg tggcctagtg                                            20


<210> SEQ ID NO 6
<211> LENGTH: 20
<212> TYPE: DNA
<213> ORGANISM: Artificial Sequence
<220> FEATURE:
<223> OTHER INFORMATION: oligonucleotide having 2'-O-methyl-modified
      riboses and having phosphorothioate-modified internucleotide
      phosphates
<220> FEATURE:
<221> NAME/KEY: misc_feature
<222> LOCATION: (1)..(20)
<223> OTHER INFORMATION: 2'-O-methyl-modified riboses
<220> FEATURE:
<221> NAME/KEY: misc_feature
<222> LOCATION: (1)..(20)
<223> OTHER INFORMATION: phosphorothioate-modified internucleotide
      phosphates

<400> SEQUENCE: 6

atcagatgcg tggcctagtg                                            20
```

<210> SEQ ID NO 7
<211> LENGTH: 20
<212> TYPE: DNA
<213> ORGANISM: Artificial Sequence
<220> FEATURE:
<223> OTHER INFORMATION: Gapmer oliguncleotide with a central single stranded oligonucleotide sequence flanked on both ends by single stranded 2'-O-methyl-modified oligonucleotide sequences and having phosphorothioate-modified internucleotide phosphates
<220> FEATURE:
<221> NAME/KEY: misc_feature
<222> LOCATION: (1)..(20)
<223> OTHER INFORMATION: phosphorothioate-modified internucleotide phosphates
<220> FEATURE:
<221> NAME/KEY: misc_feature
<222> LOCATION: (1)..(4)
<223> OTHER INFORMATION: 2'-O-methyl-modified riboses
<220> FEATURE:
<221> NAME/KEY: misc_feature
<222> LOCATION: (17)..(20)
<223> OTHER INFORMATION: 2'-O-methyl-modified riboses

<400> SEQUENCE: 7
atcagatgcg tggcctagtg 20

<210> SEQ ID NO 8
<211> LENGTH: 20
<212> TYPE: DNA
<213> ORGANISM: Artificial Sequence
<220> FEATURE:
<223> OTHER INFORMATION: oligonucleotide having phosphorothioate-modified internucleotide phosphates
<220> FEATURE:
<221> NAME/KEY: misc_feature
<222> LOCATION: (1)..(20)
<223> OTHER INFORMATION: phosphorothioate-modified internucleotide phosphates

<400> SEQUENCE: 8
atcagatgcg tggcctagtg 20

<210> SEQ ID NO 9
<211> LENGTH: 20
<212> TYPE: DNA
<213> ORGANISM: Artificial Sequence
<220> FEATURE:
<223> OTHER INFORMATION: Gapmer oliguncleotide with a central single stranded DNA oligonucleotide sequence flanked on both ends by single stranded 2'-O-methyl RNA oligonucleotide sequences and having phosphorothioate-modified internucleotide phosphates
<220> FEATURE:
<221> NAME/KEY: misc_feature
<222> LOCATION: (1)..(4)
<223> OTHER INFORMATION: 2'-O-methyladenosine, um, cm, 2'-O-methyladenosine
<220> FEATURE:
<221> NAME/KEY: misc_feature
<222> LOCATION: (1)..(20)
<223> OTHER INFORMATION: phosphorothioate-modified internucleotide phosphates
<220> FEATURE:
<221> NAME/KEY: misc_feature
<222> LOCATION: (17)..(20)
<223> OTHER INFORMATION: 2'-O-methyladenosine, gm, um, gm

<400> SEQUENCE: 9
annagatgcg tggcctannn 20

<210> SEQ ID NO 10
<211> LENGTH: 20

```
<212> TYPE: DNA
<213> ORGANISM: Artificial Sequence
<220> FEATURE:
<223> OTHER INFORMATION: Gapmer oliguncleotide with a central single
      stranded oligonucleotide sequence flanked on both ends by single
      stranded 2'-O-methyl-modified oligonucleotide sequences and having
      phosphorothioate-modified internucleotide phosphates
<220> FEATURE:
<221> NAME/KEY: misc_feature
<222> LOCATION: (1)..(4)
<223> OTHER INFORMATION: 2'-O-methyladenosine, tm, cm,
      2'-O-methyladenosine
<220> FEATURE:
<221> NAME/KEY: misc_feature
<222> LOCATION: (1)..(20)
<223> OTHER INFORMATION: phosphorothioate-modified internucleotide
      phosphates
<220> FEATURE:
<221> NAME/KEY: misc_feature
<222> LOCATION: (17)..(20)
<223> OTHER INFORMATION: 2'-O-methyladenosine, gm, tm, gm

<400> SEQUENCE: 10

annagattcg gggcctannn                                               20


<210> SEQ ID NO 11
<211> LENGTH: 20
<212> TYPE: DNA
<213> ORGANISM: Artificial Sequence
<220> FEATURE:
<223> OTHER INFORMATION: unmodified DNA

<400> SEQUENCE: 11

atcagatgcg tggcctagtg                                               20


<210> SEQ ID NO 12
<211> LENGTH: 18
<212> TYPE: DNA
<213> ORGANISM: Artificial Sequence
<220> FEATURE:
<223> OTHER INFORMATION: oligonucleotide having phosphorothioate-
      modified internucleotide phosphates
<220> FEATURE:
<221> NAME/KEY: misc_feature
<222> LOCATION: (1)..(18)
<223> OTHER INFORMATION: phosphorothioate-modified internucleotide
      phosphates

<400> SEQUENCE: 12

ggtcagacca gtgagttc                                                 18


<210> SEQ ID NO 13
<211> LENGTH: 25
<212> TYPE: DNA
<213> ORGANISM: Artificial Sequence
<220> FEATURE:
<223> OTHER INFORMATION: Forward Primer for ICAM-1 cDNA

<400> SEQUENCE: 13

gccacttctt ctgtaagtct gtggg                                         25


<210> SEQ ID NO 14
<211> LENGTH: 17
<212> TYPE: DNA
<213> ORGANISM: Artificial Sequence
<220> FEATURE:
<223> OTHER INFORMATION: Reverse Primer for ICAM-1 cDNA

<400> SEQUENCE: 14

ctaccggccc tgggacg                                                  17
```

-continued

```
<210> SEQ ID NO 15
<211> LENGTH: 20
<212> TYPE: DNA
<213> ORGANISM: Artificial Sequence
<220> FEATURE:
<223> OTHER INFORMATION: Forward Primer for cDNA encoding human GAPDH

<400> SEQUENCE: 15

aacagcgaca cccactcctc                                                20


<210> SEQ ID NO 16
<211> LENGTH: 21
<212> TYPE: DNA
<213> ORGANISM: Artificial Sequence
<220> FEATURE:
<223> OTHER INFORMATION: Reverse Primer for cDNA encoding human GAPDH

<400> SEQUENCE: 16

ggaggggaga ttcagtgtgg t                                              21
```

ANTISENSE DRUG AGAINST THE HUMAN INTERCELLULAR ADHESION MOLECULE 1 (ICAM-1)

This application is a 371 of PCT/EP2019/085539 filed Dec. 17, 2019, which claims priority to EP19153666.3 filed Jan. 25, 2019.

DESCRIPTION

The official copy of the Sequence Listing is submitted concurrently with the specification as an ASCII formatted text file via EFS-Web, with a file name of "UL002_ST25.txt", a creation date of Jul. 13, 2021, and a size of 8 kilobytes. The Sequence Listing filed via EFS-Web is part of the specification and is incorporated in its entirety by reference herein.

The present invention relates to a specific antisense oligonucleotide which inhibits the expression of the adhesion molecule ICAM-1 in human cells. The present invention further relates to a vector containing said oligonucleotide and a host cell containing said vector or oligonucleotide and a pharmaceutical composition containing said oligonucleotide as well as uses thereof, in particular in the treatment of an inflammatory disease or condition in humans.

Antisense oligonucleotides (asON) are synthetic single-stranded nucleic acids ranging in length typically between 16 and 24 nucleotides. They bind via Watson-Crick interactions to single-stranded target messenger RNA (mRNA) in a sequence-specific fashion and, thus, represent a major tool to interfere with gene expression, mainly by suppressing target gene expression at the post-transcriptional level.

Since the first report on asON in 1978 (cf. Zamecnik, P. C., Stephenson, M. L., Proc. Natl. Acad. Sci., U.S A., Vol. 75, pp. 280-284 (1978)), a large variety of chemical modifications has been developed which improves efficacy by a number of characteristics including (i) extended half live in target cells and target environments, (ii) biological potency by increasing the stability of complexes with target mRNA, (iii) improved delivery to target cells and tissues, and (iv) reduced non-specific toxicity and undesired side effects such as for example immune-stimulation. Thereby, all moieties of oligonucleotides (i.e. the sugar moiety, the nucleobase, and the inter-nucleotide phosphate backbone) have been the subject of chemical modifications.

Over the past decades three to almost four so-called "generations of chemistry" for asON have been developed (cf. Deleavey, G. F., Damha, M. J., Chemistry & Biology, Vol. 19, pp. 937-954 (2012); Khvorova, A., Watts, J. K., Nat. Biotechnol., Vol. 35, pp. 238-248 (2017)). In general, the more advanced generations of asON are characterised by progressive improvements of the above mentioned typical characteristics of asON. A comparison of the extent of antisense effects by a relevant set of chemically modified asON clearly shows the order of potency, being LNA (locked nucleic acid)>phosphorothioate-modified backbone >2'-OMe-modified sugars (cf. FIG. 1 and Table 1 as well as Grünweller, A. et al., Nucl. Acids Res., Vol. 31, pp. 3185-3193 (2003)).

TABLE 1

Order of the performance of modified asON as shown by the $IC_{50}$ values.

| chemistry | $IC_{50}$ (nm) |
|---|---|
| phosphorothioate | 70 ± 20 |
| LNA | 0.4 ± 0.07 |

TABLE 1-continued

Order of the performance of modified asON as shown by the $IC_{50}$ values.

| chemistry | $IC_{50}$ (nm) |
|---|---|
| 2'-OMe gapmer | 220 ± 10 |
| siRNA | 0.06 ± 0.02 |

The second crucial prerequisite for a high potency of asON is related to the local structure of the target RNA and its accessibility (cf. Bo, X. et al., BMC Bioinformatics 7:122, (2006); Schubert, S. et al., J. Mol. Biol. Vol. 348, pp. 883-893 (2005); Sczakiel, G., Kretschmer-Kazemi Far, R., Curr. Opin. Mol. Ther., Vol. 4, pp. 149-153 (2002)). This factor cannot be changed once a local target site has been defined. Thus, in case of a given favourable local target site, efficacy can only be improved by properties of the chosen antisense molecule, i.e. by modifying its chemistry.

Typically, the biological efficacy of asON is tested in appropriated cell systems. In case of human target genes, testing starts with appropriate human cell lines. Generally, the dose of an inhibitor giving rise to 50% target inhibition ($IC_{50}$ value) is used to compare efficacy. However, in case of oligonucleotide-based drugs/inhibitors, dose-response relationships may be irregular. This means that sometimes 100% target gene suppression cannot be achieved or that inhibition is not dose-dependent. Thus, more parameters are preferably used to characterize biological effects of asON. Thus, inhibition studies concerning the use of asON against a given target are often characterized by (i) the "maximal achievable extent of target suppression", (ii) the concentration of half maximal target suppression ($IC_{50}$ value), the extent of target inhibition at a given asON concentration (e.g. 100 nM), and (iv) the overall dose-response relationship. These critical parameters of target suppression often vary in a non-rational fashion. For this reason, a comprehensive description of the action of the antisense oligonucleotides and control oligonucleotides is commonly considered.

A particularly interesting target for asON represents the mRNA of the gene for human intercellular adhesion molecule 1 (ICAM-1; CD54), in order to prevent or treat e.g. inflammatory processes in humans. ICAM-1 already shows a basal gene expression in healthy cells, which is often about 40-50% of the stimulated expression in inflammations. When inhibiting ICAM-1 in order to prevent or inhibit inflammation in humans, it is preferable not to fall below the healthy basal expression level, as this could lead to undesirable side effects. The ICAM-1 inhibitor antisense nucleic acids should also not cause side effects due to toxicity or due to an unspecific immunostimulatory effect and should be the most cost-effective to produce.

A great variety of asON against ICAM-1 has been described so far (cf. e.g.: Chiang, M-Y. et al., J. Biol. Chem., Vol. 266, pp. 18162-18171 (1991); Patzel, V. et al., Nucl. Acids Res., Vol. 27, pp. 4328-4334 (1999)). However, these asON suffer from different draw-backs, such as a non-optimized inhibitory effect (e.g. poor efficacy or suppression under the basal expression level), toxicity, unspecific immunostimulatory effects (such as due to the CpG motif), and extensive production costs.

Thus, the technical problem underlying the present invention is to provide means for inhibiting gene expression of ICAM-1 close to basal expression level and with the means having low toxicity and unspecific immunostimulatory effects to human cells and being accessible at low production costs.

The solution to the above technical problem is achieved by the embodiments characterized in the claims.

In particular, in a first aspect, the present invention relates to an antisense oligonucleotide comprising the nucleotide sequence according to SEQ ID NO: 1 or a fragment thereof. The antisense oligonucleotide of the present invention is in particular directed to the specific mRNA sequence of ICAM-1 as target molecule and can preferably bind to the positions 1841-1860 of the ICAM-1 mRNA (HSICAM01: J03132).

In this context, the specific antisense oligonucleotide used herein is advantageously able to suppress stimulated ICAM-1 expression and simultaneously preferably able not to (significantly) suppress the level of basal ICAM-1 expression in humans. In particular, it is possible to suppress stimulated ICAM-1 expression to a larger extent as in previously known asON targeting ICAM-1, which do not have an efficacy of greater than 30% to 35% remaining gene expression of the IL-1β-stimulated range under experimental conditions. With the antisense oligonucleotide of the present invention it is preferably possible to down-regulate the IL-1β-stimulated range of ICAM-1 gene expression to 40% or less and −10% or more even in the specific case of chemical modifications of the $1^{st}/2^{nd}$ generation, which have been previously in general not known for a major improvement of efficacy or even known for lower potency.

In preferred embodiments, the antisense oligonucleotide of the present invention is for use in a method of preventing or treating a disease or condition in a human, wherein the disease or condition is associated with an overexpression of ICAM-1. Preferably, the disease or condition is selected from acute or chronic inflammatory diseases or conditions, viral infections, metastasis, inflammations of the skin, mobilization of haematopoietic stem cells, coryza, ulcerative colitis, rheumatoid arthritis, lupus erythematosus, organ rejection reactions, graft-versus-host reactions for allogeneic bone marrow transplantation, psoriasis, asthma, and neurodermatitis. Preferably, the disease or condition is an inflammatory disease or condition of the oral cavity in a human. Preferably, the inflammatory disease or condition of the oral cavity to be prevented or treated is a chronical inflammation of the gum, e.g. a periodontal disease or condition, more preferably a periodontal disease or condition selected from the group consisting of gingivitis, chronic periodontitis, aggressive periodontitis, periodontitis and peri-implantitis or mukosivitis as a manifestation of systemic disease, necrotizing ulcerative gingivitis, necrotizing ulcerative periodontitis, abscesses of the periodontium, and combined periodontic-endodontic lesions.

The term "oligonucleotide" as used herein relates to native, semi-synthetic, synthetic or (chemically) modified, single or double stranded nucleic acid molecules of deoxyribonucleotides and/or ribonucleotides and/or modified nucleotides. Suitable modified nucleotides comprise nucleotides with modified bases, sugars, and/or phosphate groups. Methods for the preparation, isolation and/or purification of oligonucleotides are known in the art and comprise chemical synthetic or enzymatic methods and subsequent purification of the oligonucleotides. In a preferred embodiment, the oligonucleotide is a single- or double-stranded oligonucleotide, preferably a single stranded modified oligonucleotide of the chemistries outlined above, more preferably a gapmer oligonucleotide.

Herein the term "gapmer oligonucleotide" refers to an oligonucleotide comprising a central single-stranded oligonucleotide sequence flanked on one or both ends by single-stranded segments of a different chemical composition, e.g. by 2'-O-methyl RNA oligonucleotide sequences. These terminal oligonucleotide sequences each preferably have a length of 2 to 7, more preferably 4, oligonucleotides. Preferably, the gapmer oligonucleotide is a second-generation RNA/DNA gapmer oligonucleotide, comprising 2'-O-methyl recognition arms and a nucleic acid core to invoke specific RNAse H cleavage.

Here the term "fragments of the nucleotide sequence according to SEQ ID NO: 1" means biologically active fragments of the nucleotide sequence according to SEQ ID NO: 1 having at least 10, at least 12, at least 15, or 18 nucleotides of SEQ ID NO: 1, i.e., said fragments have 10, 12, 15, or 18 nucleotides of SEQ ID NO: 1. In specific embodiments, said oligonucleotide consists of said fragments, i.e., said oligonucleotide has a length of 10, 12, 15, or 18 nucleotides. An oligonucleotide comprising said fragments preferably has a length of at least 10, 12, 15, or 18 nucleotides, and at most 50 nucleotides or less, more preferably 40 nucleotides or less, more preferably 35 nucleotides or less, more preferably 30 nucleotides or less, and most preferably 25 nucleotides or less. The term "biologically active" refers to the ability of these fragments to bind to the specific RNA sequence of ICAM-1 as target molecule and to suppress stimulated gene expression and preferably not to (significantly) suppress basal gene expression of ICAM-1.

In a particularly preferred embodiment, the oligonucleotide of the present invention comprises the entire nucleotide sequence according to SEQ ID NO: 1. Preferably, said oligonucleotide consists of said nucleotide sequence, i.e., said oligonucleotides has a length of 20 nucleotides. An oligonucleotide comprising said nucleotide sequence preferably has a length of 20 to 50 nucleotides, more preferably 20 to 40 nucleotides, more preferably 20 to 35 nucleotides, more preferably 20 to 30 nucleotides, and most preferably 20 to 25 nucleotides.

As mentioned above, the antisense oligonucleotide of the present invention is able to down-regulate the stimulated range, preferably the IL-1β-stimulated range, of ICAM-1 gene expression. The stimulated range, preferably the IL-1β-stimulated range, of ICAM-1 gene expression is preferably down-regulated to 40% or less, more preferably 30% or less, more preferably 20% or less, more preferably 10% or less, more preferably 8.0% or less, more preferably 6.0% or less, more preferably 5.0% or less, and most preferably 4.0% or less, based on 100% stimulated, preferably IL-1β-stimulated, ICAM-1 gene expression. Moreover, the antisense oligonucleotide of the present invention is preferably simultaneously able not to (significantly) suppress the level of basal ICAM-1 expression in humans. Thus, the stimulated range, preferably the IL-1β-stimulated range, of ICAM-1 gene expression is preferably down-regulated to −10% or more, more preferably −5.0% or more, more preferably −3.0% or more, more preferably −1.0% or more, and most preferably 0.0% or more, based on 100% stimulated, preferably IL-1β-stimulated, ICAM-1 gene expression. The above values correspond to the maximum suppression state.

In another aspect, the present invention relates to a vector comprising the antisense oligonucleotide according to the present invention. The above statements and definitions analogously apply to this aspect of the present invention. The term "vector" as used herein relates to any vehicle for the transportation of a nucleic acid into a cell. In particular, said term includes plasmid vectors, viral vectors, cosmid vectors, and artificial chromosomes, wherein plasmid vectors are particularly preferred. Respective vectors are known in the art. Moreover, the term "vector comprising the antisense oligonucleotide according to the present invention" encompasses a vector which comprises a sequence complementary to the antisense oligonucleotide according to the present invention, which leads to the antisense oligonucleotide according to the present invention after transcription.

In a further aspect, the present invention relates to a host cell comprising the vector and/or the antisense oligonucleotide of the present invention. The above statements and definitions analogously apply to this aspect of the present invention. Respective host cells are known in the art. They include for example suitable bacterial cells, yeast cells, plant cells, insect cells, and mammalian cells.

In another aspect, the present invention relates to a pharmaceutical composition comprising the antisense oligonucleotide according to the present invention in a pharmaceutically active amount, and optionally a pharmaceutically acceptable carrier, excipient or diluent. The above statements and definitions analogously apply to this aspect of the present invention.

The term "medicament" as used herein relates to any pharmaceutical composition comprising at least the antisense oligonucleotide according to the present invention in a pharmaceutically active amount.

According to the present invention, the pharmaceutical composition may be administered by any administration route known in the art being suitable for delivering a medicament to a human. The route of administration does not exhibit particular limitations and includes for example oral application, dermal application, local application, other forms of topic application (e.g. in the use of delivery devices). The pharmaceutical composition of the present invention is preferably able to release an oligonucleotide in tissue, especially including mucosa tissue.

The concentration of the antisense oligonucleotide in the pharmaceutical composition of the present invention is not particularly limited. For example, the concentration of the antisense oligonucleotide in the pharmaceutical composition may be from 1.0 pM to 10 M, preferably from 0.10 μM to 5.0 M, more preferably from 1.0 μM to 500 mM, more preferably from 10 μM to 500 μM, even more preferably from 50 μM to 200 μM.

In a further aspect, the present invention relates to a kit comprising the antisense oligonucleotide according to the present invention. The above statements and definitions analogously apply to this aspect of the present invention. In preferred embodiments, the kit of the present invention further comprises suitable buffers and/or suitable disposables and/or suitable enzymes.

In a further aspect, the present invention relates to the use of the antisense oligonucleotide according to the present invention for reducing the expression of ICAM-1. The above statements and definitions analogously apply to this aspect of the present invention. In a preferred embodiment, the use is carried out in vitro.

In a further aspect, the present invention relates to a method for reducing the expression of ICAM-1, comprising the step of introducing the antisense oligonucleotide according to the present invention or the vector according to the present invention into a human cell. The above statements and definitions analogously apply to this aspect of the present invention. In a preferred embodiment, the method is carried out in vitro.

The present invention relates to the following nucleotide sequences.

(CMas 1840)

SEQ ID NO: 1

5'-mA-mU-m(5mC)-mA-G-A-T-G-(5mC)-G-T-G-G-(5mC)-(5mC)-T-mA-mG-mU-mG-3'

N=2'-deoxy nucleoside;

mN=2'-O-methyl nucleoside;

5mC=2'-deoxy-5-methyl-cytidine;

m(5mC)=2'-O-methyl 5-methyl-cytidine;

all internucleotide phosphates are monophosphorothioate-modified.

In the following SEQ ID NOs: 2 to 12, the following abbreviations are applied:

L=LNA-modified nucleotide (LNA, locked nucleic acid);

F=2'-fluoro-modified ribose;

M=2'-O-methyl-modified ribose;

*=phosphorothioate-modified internucleotide phosphate;

(CV1; locked nucleic acids)

SEQ ID NO: 2

5'-$A_L$-$T_L$-$C_L$-$A*_L$-G*-A*-T*-G*-C*-G*-T'-G*-G*-C*-C*-T-$A_L$-$G_L$-$T_L$-$G_L$-3'

(CV2; all 2'-fluoro-modified sugars)

SEQ ID NO: 3

5'-$A_F$-$T_F$-$C_F$-$A_F$-$G_F$-$A_F$-$T_F$-$G_F$-$C_F$-$G_F$-$T_F$-$G_F$-$G_F$-$C_F$-$C_F$-$T_F$-$A_F$-$G_F$-$T_F$-$G_F$-3'

(CV3; gapmer: 2'-fluoro-modified sugars)

SEQ ID NO: 4

5'-$A*_F$-$T*_F$-$C*_F$-$A*_F$-G*-A*-T*-G*-C*-G*-T*-G*-G*-C*-C*-T*-$A*_F$-$G*_F$-$T*_F$-$G_F$-3'

(CV4; 2'-O-methyl-modified sugars)

SEQ ID NO: 5

5'-$A_M$-$T_M$-$C_M$-$A_M$-$G_M$-$A_M$-$T_M$-$G_M$-$C_M$-$G_M$-$T_M$-$G_M$-$G_M$-$C_M$-$C_M$-$T_M$-$A_M$-$G_M$-$T_M$-$G_M$-3'

(CV5; 2'-O-methyl-modified sugars and all-phosphorothioate-modified phosphates)

SEQ ID NO: 6

5'-$A*_M$-$T*_M$-$C*_M$-$A*_M$-$G*_M$-$A*_M$-$T*_M$-$G*_M$-$C*_M$-$G*_M$-$T*_M$-$G*_M$-$G*_M$-$C*_M$-$C*_M$-$T*_M$-$A*_M$-$G*_M$-$T*_M$-$G_M$-3'

(CV6; gapmer: 2'-O-methyl-modified ribose and all-phosphorothioate-modified phosphates)

SEQ ID NO: 7

5,-$A*_M$-$T*_M$-$C*_M$-$A*_M$-G*-A*-T*-G*-C*-G*-T*-G*-G*-C*-C*-T*-$A*_M$-$G*_M$-$T*_M$-$G_M$-3'

(CV7; all-phosphorothioate-modified phosphates)

SEQ ID NO: 8

5'-A*-T*-C*-A*-G*-A*-T*-G*-C*-G*-T*-G*-G*-C*-C*-T*-A*-G*-T*-G-3'

(CV8; gapmer: 2'-O-methyl-modified ribose and all-phosphorothioate-modified phosphates; no m(5mC) as in SEQ ID No: 1)

SEQ ID NO: 9

5'-$A*_M$-$U*_M$-$C*_M$-$A*_M$-G*-A*-T*-G*-C*-G*-T*-G*-G*-C*-C*-T*-$A*_M$-$G*_M$-$U*_M$-$G_M$-3'

-continued (CV9; mis-match control; gapmer: 2'-O-methyl-modified ribose and all-phosphorothioate-modified phosphates; mis-matching T and G at positions 8 and 11, respectively)

SEQ ID NO: 10

5'-A*$_M$-T*$_M$-C*$_M$-A*$_M$-G*-A*-T*-T*-C*-G*-G*-G*-G*-C*-C*-T*-A*$_M$-G*$_M$-T*$_M$-G$_M$-3'

(CV10; unmodified DNA)

SEQ ID NO: 11

5'-A-T-C-A-G-A-T-G-C-G-T-G-G-C-C-T-A-G-T-G-3'

(CV11; unrelated control sequence, all-phosphorothioate-modified phosphates)

SEQ ID NO: 12

5'-G*-G*-T*-C*-A*-G*-A*-C*-C*-A*-G*-T*-G*-A*-G*-T*-T*-C-3' the FIGURE Shows:

FIG. 1: Order of the performance of modified asON derived from Grünweller et al. (cf. Grünweller, A. et al., Nucl. Acids Res., Vol. 31, pp. 3185-3193 (2003)): LNA>phosphorothioate>O-methyl gapmer. In this set, siRNA is the most potent inhibitor. This order is shown by the dose-response relationship. Abbreviations for modified asON from original literature are fully written here for clarity.

The present invention will be further illustrated in the following examples without being limited thereto.

MATERIALS AND METHODS

Oligonucleotides

All oligonucleotides were obtained from commercial suppliers. The quality control included UV absorption measurements and integrity check by gelelectrophoresis. The yield and purity of all oligonucleotides was determined by UV absorption spectroscopy and the integrity was controlled with 20% denaturing polyacrylamide gels followed by staining with Stains-All (SIGMA-ALDRICH, Deisenhofen, Germany).

Cell Lines and Cell Culture

The human cell line ECV304 was used to measure the influence of oligonucleotides on the expression of the endogenous target gene intercellular adhesion molecule 1 (ICAM-1; CD54, Cluster of Differentiation 54). According to the DSMZ-German Collection of Microorganisms and Cell Cultures (Braunschweig, Germany) DNA fingerprinting shows that ECV304 is a derivative of the human urinary bladder carcinoma cell line T-24 (cf. Dirks, W. G. et al. In Vitro Cell Dev. Biol., Vol. 35, pp. 558-559, (1999)) which expresses ICAM-1 in an inducible manner.

ECV304 cells were maintained in medium 199 (SIGMA-ALDRICH, Deisenhofen, Germany) buffered with 25 mM Hepes pH 7.4 and supplemented with 0.68 mM L-glutamine and 10% FCS (fetal calf serum, Invitrogen, Karlsruhe, Germany). Cells were routinely splitted 2-3 times a week after trypsinization. For stimulation of ICAM-1 (CD54) 200 U/ml interleukin 1β (IL-1β; PromoCell, Heidelberg, Germany) was added to the medium and cells were incubated overnight (16 to 18 hours).

Inhibition Characteristics of Antisense Oligonucleotide of the IL-1β-Induced State of ICAM-1 Gene Expression in Human ECV-304 Cells

Transfection of Cells with asON

ECV304 cells were seeded in 12-well culture plates at a density of $1.5\times10^5$ cells/well, 15 hours prior to oligonucleotide treatment. Then, the cells were washed once with pre-warmed (37° C.) serum-reduced Opti-MEM I medium (Invitrogen, Karlsruhe, Germany). To deliver asON to cells there were used two transfection protocols: (1) Transfection with the cationic lipid DOTMA/DOPE (Lipofectin; Invitrogen/Thermo Fisher, Rockford, U.S.A.) was carried out with 1 ml of Opti-MEM I medium containing 0.1 μM asON or siRNA and 5 μg/ml of the Lipofectin per well. (2) Using Lipofectamine 2000 (Invitrogen/Thermo Fisher, Rockford, U.S.A.), the transfection of asON was performed with 0.4 ml Opti-MEM I medium containing 0.1 μM asON and 10 μg/ml of Lipofectamine 2000 per well. The cells were incubated for 4 hours at 37° C., 5% $CO_2$. Subsequently, the transfection medium was replaced by medium 199 containing 10% FCS. After an incubation of 4 hours at 37° C., 5% $CO_2$ the medium was again substituted with medium 199 containing 10% FCS and 200 U/ml IL-1β to stimulate/CAM-1 expression. For immunofluorescence analysis cells were removed from the culture dish by trypsinization with 100 μl 0.25% trypsin/0.02% EDTA in PBS (phosphate buffered saline) for 5 minutes at 37° C. 16 to 18 hours after stimulation with IL-1β. ICAM-1-specific gene expression of cells treated with IL-1 β and control asON or siRNA was set to 100%, while gene expression of cells treated with control asON or siRNA only was defined as basal expression level.

Quantification of ICAM-1-Specific Target Protein: Immunofluorescence Staining and Flow Cytometry Cells were washed with phosphate-buffered saline (PBS, pH 7.4) and incubated with a phycoerythrin (PE)-conjugated CD54 monoclonol antibody (clone LB-2) or an isotype-identical PE control (both, Becton Dickinson, Heidelberg, Germany) in 50 μl PBS containing 1% BSA (Bovine Serum Albumin) at 4° C. for 30 minutes. Subsequently, cells were washed with PBS and suspended in PBS containing 1% paraformaldehyde (pH 7.4). The cells were analysed using a Becton Dickinson FACSCalibur and CellQuest Pro software (Becton Dickinson, Heidelberg, Germany). After gating out dead cells, the mean (PE)-fluorescence intensity was determined and the inhibition of ICAM-1 gene expression was standardized to the IL-1β-induced state which was set to 100%. Basal gene expression levels were at approximately 35%.

Quantification of ICAM-1-Specific Target RNA: Quantitative RT-PCR

Total RNA was extracted from transfected cells using RNeasy mini kit including treatment with RNase-free DNase I (Qiagen, Hilden, Germany). The yield and purity of RNA were determined by spectrophotometry. Synthesis of cDNA was carried out using random hexamer primers and Superscript II RNase H-reverse transcriptase according to the manufacturer's specifications (Invitrogen/Thermo Fisher, Rockford, U.S.A.). Quantitative PCR was performed using the GeneAmp 5700 sequence detection system (Applied Biosystems/Thermo Fisher, Rockford, U.S.A.) and SYBR green PCR core reagents (Eurogentec, Seraing, Belgium). ICAM-1 cDNA was amplified with the forward primer 5'-GCCACTTCTTCTGTAAGTCTGTGGG-3' (SEQ ID NO: 13) and reverse primer 5'-CTACCGGCCCTGGGACG-3' (SEQ ID NO: 14) resulting in a fragment of 300 bp. Samples were standardized using primers specific to cDNA encoding human GAPDH (forward primer, 5'-AACAGCGACACCCACTCCTC-3' (SEQ ID NO: 15) and reverse primer, 5'-GGAGGGGAGATTCAGTGTGGT-3' (SEQ ID NO: 16)_) resulting in a product of 258 bp. Standard curves were obtained after amplification of $2.5\times10^3$ to $2.5\times10^7$ copies of purified plasmid pP5, a derivative of pEGFP-C1 carrying the amplicon generated with the ICAM-1 primer set and plasmid pCR-GAPDH, a derivative of pCR 2.1 harbouring the GAPDH amplicon sequences.

The results of the above experiments are summarized in Table 2 below.

TABLE 2

Inhibition characteristics of antisense oligonucleotide of the IL-1β-induced state of ICAM-1 gene expression in human ECV-304 cells. The value of 0% is equivalent to the basal expression level. Negative values indicate suppression below basal expression levels.

| ON[1)] as SEQ ID NO | max. suppr. state (%) | ON conc. at max. suppr. (nM) | $IC_{50}$ (nM) | ICAM-1 expr.[3)] at 100 nM ON |
|---|---|---|---|---|
| 1 | 5 | 22 | 4 | 3 |
| 2[2)] | −30[2)] | 3 | 0.2 | −4[2)] |
| 3 | 45 | 100 | 70 | 36 |
| 4 | 4 | 20 | 1 | 11 |
| 5 | nd | nd | >60 | 60 |
| 6 | nd | nd | >98 | 98 |
| 7 | 7 | 30 | 4 | 1 |
| 8 | | | 41 | 16 |
| 9 | | >25 | 12 | 0 |
| 10 | — | — | — | — |
| 11 | — | — | >100 | — |
| 12 | — | — | — | — |

[1)]ON, oligonucleotide.

[2)]The negative values are related to suppression of ICAM-1 in ECV304 cells below the non-induced state. This most potent LNA-modified molecule suppresses ICAM-1 expression below basal level, which is not preferred as outlined above. Only the induced state above basal levels, i.e. increased levels of ICAM-1 expression seem to be related to chronic inflammation.

[3)]Gene expression on the level of RNA is comparable with the protein level (cf. Kretschmer-Kazemi Far, R., Sczakiel, G., Nucl. Acids Res., Vol. 31, pp. 4417-4424, (2003)).

nd, cannot be determined

—, no measurable target inhibition

Furthermore, the following Table 3 summarizes the data for the oligonucleotides of SEQ ID Nos 1 to 9 given in Table 2 and provides further characteristic of the corresponding oligonucleotides e.g. with respect to toxicity and immunostimulatory potential as well as production costs.

TABLE 3

Chemistry-related characteristics: a ranked comparison of the efficacy, toxicity, immune-stimulation, and costs for the antisense oligonucleotide of SEQ ID NO: 1 according to the present invention and for the different classes of chemical modifications of the antisense oligonucleotides studied for inhibition of the IL-1β-induced state of ICAM-1 gene expression in human ECV-304 cells. Categorisation is based on published data which are not sequence-dependent and rather related to the type of chemical modification or on characteristics of known sequence motifs (e.g. the immune-stimulatory CpG motif).

| ON[1)] as SEQ ID NO | efficacy[2)] | toxicity potential | immuno-stimulatory potential | costs | comments |
|---|---|---|---|---|---|
| 1 | ++ | no[3)] | no[4)] | lower | best overall performance |
| 2 | ++ | yes[6)] | yes | higher | too efficacious (see Table 2) |
| 3 | – | yes[7)] | yes[5)] | higher | |
| 4 | ++ | yes[7)] | yes | higher | CpG present and expensive |
| 5 | – | no[3)] | yes | low | |
| 6 | – | no[3)] | yes | lower | |
| 7 | ++ | no[3)] | yes | lower | CpG present |
| 8 | – | no[3)] | yes | low | |
| 9 | + | no[3)] | yes | lower | low efficacy |

[1)]ON, oligonucleotide.

[2)]++, $IC_{50}$ < 5 nM; +, $IC_{50}$ < 20 nM; –, $IC_{50}$ > 20 nM.

[3)]2'-OMe is a chemical RNA modification that occurs naturally in RNA. The phosphorothioate chemistry may be toxic at high concentrations when delivered i.v. but not e.g. topically.

[4)]No immune stimulation, since all cytosine are modified (5mC = 2'-deoxy-5-methyl-cytidine).

[5)]The immune-stimulatory potential of the 2'-fluorinated CpG motif remains unclear.

[6)]LNA modifications together with a phosphorothioate backbone showed sequence-dependent toxicity.

[7)]2'-F modifications are considered to be toxic. Metabolism in vivo may e.g. produce HF.

All oligonucleotides have been characterised for purity and amounts by polyacrylamide gel-electrophoresis and UV absorption measurement. All oligonucleotides were tested for their potency to suppress ICAM-1 expression in human ECV-304cells as described above.

Suppression of the IL-1β-induced state of ICAM-1 gene expression by asON was determined at the level of ICAM-1 protein and of target mRNA. However, both kinds of read-out behave consistently (Kretschmer-Kazemi-Far, R. et al., Oligonucleotides, Vol. 15, pp. 223-233 (2005); Kretschmer-Kazemi Far, R.,.Sczakiel, G., Nucl. Acids Res., Vol. 31, pp. 4417-4424, (2003)). There is a basal level of gene expression in the range of 30%-40% at the protein level and 15%-20% at the mRNA level, respectively, depending on individual experiments if the IL-1β-stimulated level is set to 100%.

Critical inhibition characteristics are summarized in Table 2. In contrast to common knowledge in the prior art regarding $1^{st}$ and $2^{nd}$ generation asON, it has been found that the antisense oligonucleotide of SEQ ID NO: 1 according to the present invention shows a high efficacy. Among the set of parameters this is best reflected by the low $IC_{50}$ value. In particular, chemically modified asON targeting the same local target site were one order of magnitude less potent (Patzel, V. et al. Patzel,V., Nucl. Acids Res., Vol. 27, pp. 4328-4334 (1999)) which is reflected by the $IC_{50}$ value of the control of SEQ ID NO: 8 (41 nM) in comparison to the antisense oligonucleotide of SEQ ID NO: 1 according to the present invention ($IC_{50}$: 4 nM) (Table 2).

Table 3 gives more characteristics of the oligonucleotides of SEQ ID Nos 1 to 9. The corresponding data demonstrates that for the local target site of ICAM-1 mRNA against which CMas1840 (SEQ ID NO:1) is directed, the antisense oligonucleotide of SEQ ID NO: 1 according to the present invention is the most favourable oligonucleotide, in terms of efficacy, simplicity, toxicity and immunostimulatory potential, and costs.

Moreover, the above data shows that the antisense oligonucleotide of SEQ ID NO: 1 according to the present invention acts according to the presumed “antisense mechanisms”, which is supported by the lack of target inhibition by the miss-match control of SEQ ID NO: 10 and by the scrambled control of SEQ ID NO: 12 (cf. Table 2).

As demonstrated by the above results, the antisense oligonucleotide of SEQ ID NO: 1 according to the present invention outperforms 2.5$^{th}$ and 3$^{rd}$ generation chemistries in terms of efficacy, simplicity, toxicity and immunostimulatory potential, and costs, although the chemical modifications of the antisense oligonucleotide of SEQ ID NO: 1 according to the present invention belong to the chemical modifications of 1$^{st}$ (phosphorothioate) and 2$^{nd}$ generation asON which have previously not been known for major improvements of efficacy or have even been known for lower potency in the prior art.

The invention claimed is:

1. An antisense oligonucleotide consisting of the nucleotide sequence according to SEQ ID NO: 1.

2. A vector comprising the antisense oligonucleotide according to claim 1.

3. An isolated host cell comprising the vector according to claim 2.

4. A pharmaceutical composition comprising the antisense oligonucleotide according to claim 1 in a pharmaceutically active amount, and optionally a pharmaceutically acceptable carrier, excipient or diluent.

* * * * *